2,717,013
SPIRAL GUIDE FOR A MACHINE TOOL

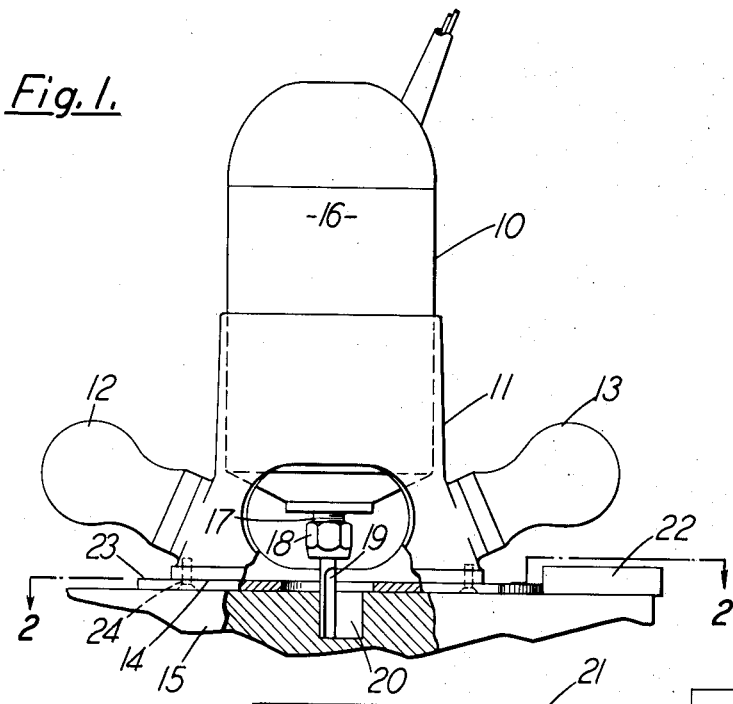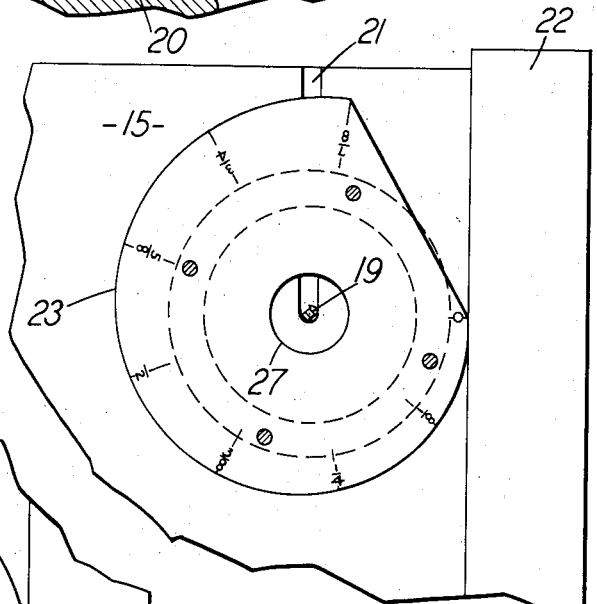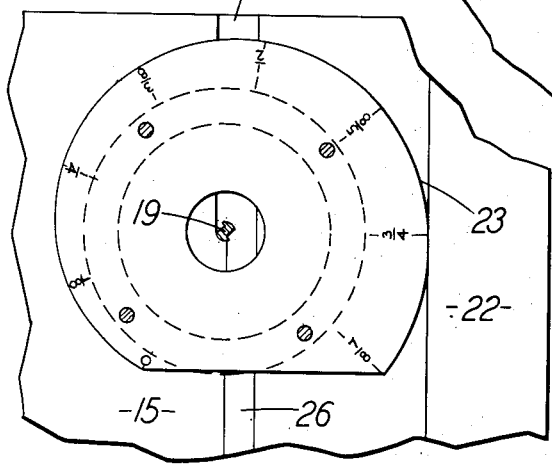

Benjamin R. Van Zwalenburg, Grand Rapids, Mich.

Application November 28, 1951, Serial No. 258,651

4 Claims. (Cl. 144—253)

The present invention relates to machine tool guiding systems, and provides a guide for a rotary tool of the general type represented by the conventional portable router. Such tools include a high-speed rotary cutter intended for use against a surface perpendicular to the axis of rotation of the cutter. The usual machine has a frame providing a working face on which the tool is rested against the workpiece in the desired attitude.

Guiding of these tools along a straight line presents something of a problem, in view of the fact that the rotation of the cutter generates a side force as it bites into the material when moving along a particular path. The use of such tools in a so-called "free hand" manner requires a considerable degree of skill on the part of the operator; and when a truly straight line is desired, it is the usual practice to resort either to a template or to an extended guiding arrangement adapted to cooperate with the edge of the panel that is being worked on. It is also general practice to secure suitable guiding strips corresponding to the desired path of the tool, allowance being made for the distance between the rotary axis of the tool and the edge of the frame against which the strip is positioned to bear.

According to these conventional guiding systems, it was necessary to re-set either the guiding strip, the template, or whatever equivalent means was used, to cut a groove or dado of greater width than the normal path established by a single passage of the cutter. It was also necessary to re-set such guiding equipment when it was desired to cut a plurality of parallel grooves which may be closely spaced. It is obvious that such re-setting of equipment that has been secured in position requires a considerable amount of time, and is particularly aggravating when the operator desires to move the path of the tool only a very small amount.

The present invention provides for guiding such a machine tool along an infinite series of parallel paths without re-setting a basic guiding strip (or equivalent device establishing a base line). With this arrangement, it is possible by making multiple passes of the tool, and without needing to re-set the guide strip, to machine a series of closely spaced parallel grooves or to progressively widen the groove cut by the first passage of the tool.

The principal component of the present invention includes a plate (in the preferred form of the invention) that is attached to the face of the router against which the workpiece normally bears, in the conventional form of the device. This plate is formed with its edge in the form of a spiral, the axis of which is approximately located upon the center of rotation of the tool. When secured to the frame of the router, the outer edge of this spiral cam plate presents an infinite series of points having progressively varying radial distance from the center of the router which may be brought to bear against a fixed guiding strip. The particular distance from the axis of the router to the guiding strip may be established by rotating the frame of the tool to a particular angular relationship with the guiding strip, and making a passage with the tool along the workpiece. Another pass may then be made at a different angular orientation of the frame of the machine with respect to the guiding strip; and the groove established by the first pass will either be widened, or a groove parallel thereto will be machined.

It is important to note that the pressure applied by the operator to the frame of the tool and directed at the guiding strip (to firmly establish the path of movement of the tool) passes approximately through the center of rotation of the tool, due to the characteristics of a spiral curve. For this reason, such side pressure does not generate any substantial tendency to rotate the frame of the tool, and thereby alter the distance that the operator desires to maintain from the guide strip. The usual portable router is provided with a pair of oppositely-disposed handles in the general shape of horns, and it is the usual practice for the operator to grasp one of these handles in each hand. Such an arrangement gives an ideal control of the angular relationship between the guide strip and the frame of the machine for fully utilizing the desirable features of the present invention.

The particular features of the present invention will be discussed in detail by an analysis of the embodiments illustrated in the accompanying drawings. In these drawings:

Figure 1 is a view in elevation of a portable router to which a spiral guide plate provided by the present invention is attached. A portion of the workpiece is shown broken away to illustrate the position of the cutter.

Figure 2 is a section taken on the plane 2—2 of Figure 1.

Figure 3 illustrates a view taken from a similar position to that of Figure 2, but showing the position of the cam plate on the first pass used for machining the wider groove illustrated in Figures 1 and 2.

Referring to Figure 1, the router 10 has a frame 11 on which are mounted the opposite horn-shaped handles 12 and 13. The frame 11 also provides a surface 14 against which the conventional device is designed to rest against a workpiece 15. The motor 16 of the router 10 drives the rotary shaft 17 provided with a chuck 18 in which the cutting tool 19 is mounted. Rapid rotation of this tool under the power supplied by the motor 16 causes the tool to cut away the material of the workpiece 15 to establish the groove 20 with the required number of passages. Each single passage of the tool along a straight line will operate to remove the material of the workpiece 15 directly within the path of a cylinder defined by the diameter of rotation of the cutting tool 19. To establish a width of groove as indicated at 20, several repeated passages of the tool are necessary. The groove established by a single passage of the tool is indicated in Figure 3 at 21.

In order to guide the router 10 along a series of spaced parallel paths to generate either the wide groove 20 or a series of grooves of the width indicated at 21, the guiding strip 22 is firmly secured in a position along a line parallel to the desired path of cut. The distance of the strip 22 from the path should be approximately that of the smallest radius of the spiral cam guide plate 23. This relationship is indicated in Figure 3. The plate 23 is firmly secured to the surface 14 of the router 10 by the screws indicated at 24 in Figure 1. After a single pass has been cut with the plate in the relationship with the guide strip 22 shown in Figure 3, the frame of the cutter is rotated with respect to the guide strip a sufficient amount to present an increased radial distance between the axis of the cutter and the guide strip. Another passage of the machine is made maintaining this angular relationship by holding the handles 12 and 13, and the groove width 21 is thereby widened in the desired amount. A suitable number of passes at different angular relationships of the frame 11 to the strip 22 will result in establishing the groove width shown at 20 in Figure 1.

Preferably, a series of points is marked adjacent the periphery of the guide plate 23 indicating the amount of increase in radius over the point of minimum radius of the plate. It is therefore possible to accurately establish a groove width of a particular amount in excess of the width of the tool corresponding to the reading at the periphery of the cam plate after a first passage is made at the minimum radius. Figure 2 illustrates the development of the increased width of the groove, the machine being moved in the direction of the arrow 24. It will be noted that the upper portion 25 of the groove (as shown in Figure 2) exceeds the width of the groove 26 by the amount being removed by the cutter 19 at that particular passage. Several passages of the tool may be made, with each passage (for example) at an increased radius of one-eighth of an inch at each pass. To perform this, the frame of the machine is simply rotated with respect to the guide strip 22 an amount corresponding to one-eighth of an inch on the peripheral markings.

It is preferred that the central portion of the guide plate 23 be formed with an aperture 27 of sufficient size to permit the escape of the chips created by the tool 19, and also to permit clear visibility of the action of the tool in the workpiece.

The particular embodiments of the present invention that have been illustrated in the accompanying drawings and discussed herein are for illustrative purposes only and are not to be considered as a limitation upon the scope of the appended claims. In these claims, it is my intention to claim the entire invention disclosed herein, except as I am limited by the prior art.

I claim:

1. In combination with a machine having a frame supporting a tool holder having an axis about which said holder and a tool are adapted to rotate, and a base defining a supporting surface disposed axially forwardly of said tool holder and transversely of and about said axis; a guide member mounted on said base, said guide member having a guiding periphery extending radially beyond said base and including a plurality of points disposed at unequal radial distances from said axis.

2. The combination as set forth in claim 1 wherein the periphery of said guide member includes a spiral.

3. The combination as set forth in claim 1 wherein said guide member includes a work engaging surface having a plurality of points defining a plane disposed axially forwardly of said supporting surface.

4. The combination as set forth in claim 1 wherein said frame bears designations corresponding to certain of said points and exposed during operation of said machine to indicate the effective radii of said periphery at the respective points.

References Cited in the file of this patent

UNITED STATES PATENTS

| | | |
|---|---|---|
| 1,745,780 | Casey | Feb. 4, 1930 |
| 1,899,883 | Sacrey | Feb. 28, 1933 |
| 2,238,304 | Belanger | Apr. 15, 1941 |
| 2,509,164 | Nath | May 23, 1950 |
| 2,587,994 | Gregory | Mar. 4, 1952 |
| 2,613,704 | Sacrey | Oct. 14, 1952 |

OTHER REFERENCES

Popular Science, page 164, August 1945.